(12) United States Patent
Slaney et al.

(10) Patent No.: US 8,930,990 B2
(45) Date of Patent: *Jan. 6, 2015

(54) SYSTEM AND METHOD FOR SELECTING ADVERTISEMENTS

(75) Inventors: Malcolm Slaney, Palo Alto, CA (US); Bonnie M. Johnson, Palo Alto, CA (US); Annarosa Tomasi, Palo Alto, CA (US); Steven E. Saunders, Cupertino, CA (US); J. Thomas Ngo, Palo Alto, CA (US); Gavin Miller, Palo Alto, CA (US); Michele M. Covell, Palo Alto, CA (US); Paul A. Freiberger, San Mateo, CA (US)

(73) Assignee: Interval Licensing LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,661

(22) Filed: Sep. 14, 2012

(65) Prior Publication Data

US 2013/0086608 A1 Apr. 4, 2013

Related U.S. Application Data

(63) Continuation of application No. 13/475,822, filed on May 18, 2012, which is a continuation of application (Continued)

(51) Int. Cl.
*H04N 7/025* (2006.01)
*H04N 21/458* (2011.01)
(Continued)

(52) U.S. Cl.
CPC ......... *H04N 21/458* (2013.01); *G06Q 30/0241* (2013.01); *G06Q 30/0269* (2013.01); *G06Q 30/0276* (2013.01); *H04H 20/10* (2013.01); *H04H 60/31* (2013.01); *H04H 60/33* (2013.01); *H04H 60/40* (2013.01); *H04H 60/45* (2013.01);

(Continued)

(58) Field of Classification Search
USPC ....................................................... 725/32–36
See application file for complete search history.

(56) References Cited

U.S. PATENT DOCUMENTS

| | | |
|---|---|---|
| 3,868,675 A | 2/1975 | Firmin |
| 4,258,386 A | 3/1981 | Cheung et al. |

(Continued)

FOREIGN PATENT DOCUMENTS

| | | |
|---|---|---|
| JP | 2054331 A | 2/1990 |
| JP | 403179895 | 8/1991 |

(Continued)

OTHER PUBLICATIONS

U.S. Appl. No. 13/475,822, filed May 18, 2012, Slaney et al.

(Continued)

*Primary Examiner* — Jun Fei Zhong
(74) *Attorney, Agent, or Firm* — Perkins Coie LLP

(57) ABSTRACT

A method for displaying interactive advertisements on a television having a controller connected thereto and configured for receiving input from a viewer of the television is disclosed. The controller has a receiver operable to receive advertisements and a processor operable to modify the advertisements. The method generally comprises requesting action by the viewer of the television, modifying an advertisement based on the action of the viewer, and displaying the modified advertisement on the television.

25 Claims, 6 Drawing Sheets

Related U.S. Application Data

No. 12/793,540, filed on Jun. 3, 2010, now Pat. No. 8,185,923, which is a continuation of application No. 09/789,926, filed on Feb. 20, 2001, now abandoned.

(60) Provisional application No. 60/185,182, filed on Feb. 25, 2000.

(51) Int. Cl.

| | |
|---|---|
| *G06Q 30/02* | (2012.01) |
| *H04H 20/10* | (2008.01) |
| *H04H 60/31* | (2008.01) |
| *H04H 60/33* | (2008.01) |
| *H04H 60/40* | (2008.01) |
| *H04H 60/45* | (2008.01) |
| *H04H 60/65* | (2008.01) |
| *H04N 5/445* | (2011.01) |
| *H04N 7/16* | (2011.01) |
| *H04N 7/173* | (2011.01) |
| *H04N 21/2343* | (2011.01) |
| *H04N 21/258* | (2011.01) |
| *H04N 21/422* | (2011.01) |
| *H04N 21/4223* | (2011.01) |
| *H04N 21/4415* | (2011.01) |
| *H04N 21/442* | (2011.01) |
| *H04N 21/45* | (2011.01) |
| *H04N 21/454* | (2011.01) |
| *H04N 21/462* | (2011.01) |
| *H04N 21/466* | (2011.01) |
| *H04N 21/472* | (2011.01) |
| *H04N 21/4722* | (2011.01) |
| *H04N 21/475* | (2011.01) |
| *H04N 21/478* | (2011.01) |
| *H04N 21/658* | (2011.01) |
| *H04N 21/81* | (2011.01) |
| *H04H 60/66* | (2008.01) |

(52) U.S. Cl.
CPC .............. *H04H 60/65* (2013.01); *H04N 5/445* (2013.01); *H04N 7/163* (2013.01); *H04N 7/17318* (2013.01); *H04N 21/234327* (2013.01); *H04N 21/25866* (2013.01); *H04N 21/42201* (2013.01); *H04N 21/42202* (2013.01); *H04N 21/4223* (2013.01); *H04N 21/4415* (2013.01); *H04N 21/44222* (2013.01); *H04N 21/4532* (2013.01); *H04N 21/454* (2013.01); *H04N 21/4621* (2013.01); *H04N 21/466* (2013.01); *H04N 21/47205* (2013.01); *H04N 21/4722* (2013.01); *H04N 21/4755* (2013.01); *H04N 21/4781* (2013.01); *H04N 21/6582* (2013.01); *H04N 21/812* (2013.01); *H04H 60/66* (2013.01); *H04N 21/478* (2013.01)
USPC .................. 725/34; 725/32; 725/33; 725/35; 725/36; 725/42; 725/46; 725/60; 725/61; 725/100; 725/133; 725/153; 705/14.4; 705/14.66; 705/14.72

(56) References Cited

U.S. PATENT DOCUMENTS

| | | |
|---|---|---|
| 4,319,286 A | 3/1982 | Hanpachern |
| 4,390,904 A | 6/1983 | Johnston et al. |
| 4,546,382 A | 10/1985 | McKenna et al. |
| 4,602,279 A | 7/1986 | Freeman |
| 4,750,052 A | 6/1988 | Poppy et al. |
| 4,750,053 A | 6/1988 | Allen |
| 4,752,834 A | 6/1988 | Koombes |
| 4,782,401 A | 11/1988 | Faerber et al. |
| 4,841,291 A | 6/1989 | Swix et al. |
| 4,845,658 A | 7/1989 | Gifford |
| 4,858,000 A | 8/1989 | Lu |
| 4,907,079 A | 3/1990 | Turner et al. |
| 4,931,865 A | 6/1990 | Scarampi |
| 5,105,184 A | 4/1992 | Pirani et al. |
| 5,151,788 A | 9/1992 | Blum |
| 5,164,992 A | 11/1992 | Turk et al. |
| 5,223,924 A | 6/1993 | Strubbe |
| 5,231,494 A | 7/1993 | Wachob |
| 5,295,064 A | 3/1994 | Malec et al. |
| 5,305,195 A | 4/1994 | Murphy |
| 5,347,632 A | 9/1994 | Filepp et al. |
| 5,410,344 A | 4/1995 | Graves et al. |
| 5,422,986 A | 6/1995 | Neely |
| 5,436,637 A | 7/1995 | Gayraud et al. |
| 5,440,337 A | 8/1995 | Henderson et al. |
| 5,446,919 A | 8/1995 | Wilkins |
| 5,481,294 A | 1/1996 | Thomas et al. |
| 5,497,185 A | 3/1996 | Dufresne et al. |
| 5,498,002 A | 3/1996 | Gechter |
| 5,504,518 A | 4/1996 | Ellis et al. |
| 5,515,098 A | 5/1996 | Carles |
| 5,532,735 A | 7/1996 | Blahut et al. |
| 5,546,071 A | 8/1996 | Zdunich |
| 5,550,735 A | 8/1996 | Slade et al. |
| 5,550,928 A | 8/1996 | Lu et al. |
| 5,550,965 A | 8/1996 | Gabbe et al. |
| 5,559,549 A | 9/1996 | Hendricks et al. |
| 5,572,643 A | 11/1996 | Judson |
| 5,579,055 A | 11/1996 | Hamilton et al. |
| 5,583,560 A | 12/1996 | Florin et al. |
| 5,589,892 A | 12/1996 | Knee et al. |
| 5,596,373 A | 1/1997 | White et al. |
| 5,600,364 A | 2/1997 | Hendricks et al. |
| 5,600,573 A | 2/1997 | Hendricks et al. |
| 5,608,445 A | 3/1997 | Mischler et al. |
| 5,619,709 A | 4/1997 | Caid et al. |
| 5,659,350 A | 8/1997 | Hendricks et al. |
| 5,661,516 A | 8/1997 | Carles |
| 5,682,195 A | 10/1997 | Hendricks et al. |
| 5,704,017 A | 12/1997 | Heckerman et al. |
| 5,708,478 A | 1/1998 | Tognazzini |
| 5,717,814 A | 2/1998 | Abecassis |
| 5,717,923 A | 2/1998 | Dedrick |
| 5,724,091 A | 3/1998 | Freeman et al. |
| 5,724,424 A | 3/1998 | Gifford |
| 5,724,472 A | 3/1998 | Abecassis |
| 5,724,521 A | 3/1998 | Dedrick |
| 5,729,279 A | 3/1998 | Fuller |
| 5,734,853 A | 3/1998 | Hendricks et al. |
| 5,740,549 A | 4/1998 | Reilly et al. |
| 5,754,939 A | 5/1998 | Herz et al. |
| 5,758,258 A | 5/1998 | Shoff et al. |
| 5,761,606 A | 6/1998 | Wolzien |
| 5,767,857 A | 6/1998 | Neely |
| 5,767,894 A | 6/1998 | Fuller et al. |
| 5,768,528 A | 6/1998 | Stumm |
| 5,771,307 A | 6/1998 | Lu et al. |
| 5,774,170 A | 6/1998 | Hite et al. |
| 5,786,845 A | 7/1998 | Tsuria et al. |
| 5,793,409 A | 8/1998 | Tetsumura et al. |
| 5,794,210 A | 8/1998 | Goldhaber et al. |
| 5,798,785 A | 8/1998 | Hendricks et al. |
| 5,801,747 A | 9/1998 | Bedard |
| 5,805,974 A | 9/1998 | Hite et al. |
| 5,812,647 A | 9/1998 | Beaumont et al. |
| 5,812,732 A | 9/1998 | Dettmer et al. |
| 5,818,512 A | 10/1998 | Fuller |
| 5,819,284 A | 10/1998 | Farber et al. |
| 5,826,165 A | 10/1998 | Echeita et al. |
| 5,828,839 A | 10/1998 | Moncreiff |
| 5,835,667 A | 11/1998 | Wactlar et al. |
| 5,862,324 A | 1/1999 | Collins |
| 5,870,151 A | 2/1999 | Korber |
| 5,872,588 A | 2/1999 | Aras et al. |
| 5,872,850 A | 2/1999 | Klein et al. |
| 5,873,068 A | 2/1999 | Beaumont et al. |

(56) References Cited

U.S. PATENT DOCUMENTS

| | | | |
|---|---|---|---|
| 5,874,986 A | 2/1999 | Gibbon et al. | |
| 5,877,755 A | 3/1999 | Hellhake | |
| 5,892,535 A | 4/1999 | Allen et al. | |
| 5,892,554 A | 4/1999 | DiCicco et al. | |
| 5,892,691 A | 4/1999 | Fowler | |
| 5,900,919 A | 5/1999 | Chen et al. | |
| 5,903,816 A | 5/1999 | Broadwin et al. | |
| 5,907,322 A | 5/1999 | Kelly et al. | |
| 5,913,040 A | 6/1999 | Rakavy et al. | |
| 5,915,243 A | 6/1999 | Smolen | |
| 5,917,553 A | 6/1999 | Honey et al. | |
| 5,918,014 A * | 6/1999 | Robinson | 709/219 |
| 5,926,207 A | 7/1999 | Vaughan et al. | |
| 5,929,849 A * | 7/1999 | Kikinis | 725/113 |
| 5,933,150 A | 8/1999 | Ngo et al. | |
| 5,933,811 A | 8/1999 | Angles et al. | |
| 5,945,988 A | 8/1999 | Williams et al. | |
| 5,946,646 A | 8/1999 | Schena et al. | |
| 5,948,061 A | 9/1999 | Merriman et al. | |
| 5,953,076 A | 9/1999 | Astle et al. | |
| 5,959,623 A | 9/1999 | van Hoff et al. | |
| 5,966,120 A | 10/1999 | Arazi et al. | |
| 5,974,398 A | 10/1999 | Hanson et al. | |
| 5,977,964 A * | 11/1999 | Williams et al. | 715/721 |
| 5,990,927 A | 11/1999 | Hendricks et al. | |
| 6,002,393 A | 12/1999 | Hite et al. | |
| 6,002,833 A | 12/1999 | Abecassis | |
| 6,005,564 A | 12/1999 | Ahmad et al. | |
| 6,006,197 A | 12/1999 | d'Eon et al. | |
| 6,006,257 A | 12/1999 | Slezak | |
| 6,008,802 A | 12/1999 | Iki et al. | |
| 6,011,895 A | 1/2000 | Abecassis | |
| 6,012,051 A * | 1/2000 | Sammon et al. | 706/52 |
| 6,020,883 A | 2/2000 | Herz et al. | |
| 6,020,931 A | 2/2000 | Bilbrey et al. | |
| 6,026,369 A | 2/2000 | Capek | |
| 6,029,045 A | 2/2000 | Picco et al. | |
| 6,034,652 A | 3/2000 | Freiberger et al. | |
| 6,036,601 A | 3/2000 | Heckel | |
| 6,038,367 A | 3/2000 | Abecassis | |
| 6,044,376 A | 3/2000 | Kurtzman, II | |
| 6,052,492 A | 4/2000 | Bruckhaus | |
| 6,052,554 A | 4/2000 | Hendricks et al. | |
| 6,075,551 A | 6/2000 | Berezowski et al. | |
| 6,100,941 A | 8/2000 | Dimitrova et al. | |
| 6,104,425 A | 8/2000 | Kanno | |
| 6,112,192 A | 8/2000 | Capek | |
| 6,141,010 A | 10/2000 | Hoyle | |
| 6,141,463 A | 10/2000 | Covell et al. | |
| 6,160,570 A | 12/2000 | Sitnik | |
| 6,169,542 B1 | 1/2001 | Hooks et al. | |
| 6,177,931 B1 | 1/2001 | Alexander et al. | |
| 6,208,386 B1 | 3/2001 | Wilf et al. | |
| 6,237,022 B1 | 5/2001 | Bruck et al. | |
| 6,240,555 B1 * | 5/2001 | Shoff et al. | 725/110 |
| 6,243,104 B1 | 6/2001 | Murray | |
| 6,282,713 B1 | 8/2001 | Kitsukawa et al. | |
| 6,286,005 B1 | 9/2001 | Cannon | |
| 6,314,569 B1 | 11/2001 | Chernock et al. | |
| 6,324,519 B1 * | 11/2001 | Eldering | 705/14.66 |
| 6,351,265 B1 * | 2/2002 | Bulman | 345/660 |
| 6,357,043 B1 | 3/2002 | Ellis et al. | |
| 6,438,751 B1 | 8/2002 | Voyticky et al. | |
| 6,457,010 B1 | 9/2002 | Eldering et al. | |
| 6,484,148 B1 | 11/2002 | Boyd | |
| 6,519,769 B1 | 2/2003 | Hopple et al. | |
| 6,526,215 B2 | 2/2003 | Hirai et al. | |
| 6,560,281 B1 | 5/2003 | Black et al. | |
| 6,570,499 B2 | 5/2003 | Kaganer | |
| 6,574,793 B1 | 6/2003 | Ngo et al. | |
| 6,597,405 B1 | 7/2003 | Iggulden | |
| 6,615,408 B1 | 9/2003 | Kaiser et al. | |
| 6,681,393 B1 * | 1/2004 | Bauminger et al. | 725/23 |
| 6,684,194 B1 | 1/2004 | Eldering et al. | |
| 6,698,020 B1 | 2/2004 | Zigmond et al. | |
| 6,708,335 B1 | 3/2004 | Ozer et al. | |
| 6,735,776 B1 | 5/2004 | Legate | |
| 6,750,880 B2 | 6/2004 | Freiberger et al. | |
| 6,788,314 B1 | 9/2004 | Freiberger et al. | |
| 6,906,732 B1 | 6/2005 | Li et al. | |
| 6,937,658 B1 | 8/2005 | Suito et al. | |
| 6,968,565 B1 | 11/2005 | Slaney et al. | |
| 6,993,245 B1 | 1/2006 | Harville | |
| 7,134,130 B1 | 11/2006 | Thomas | |
| 7,134,132 B1 | 11/2006 | Ngo et al. | |
| 7,209,631 B2 | 4/2007 | Tada et al. | |
| 7,272,295 B1 | 9/2007 | Christopher | |
| 7,348,935 B1 | 3/2008 | Freiberger et al. | |
| 7,409,437 B2 | 8/2008 | Ullman et al. | |
| 7,661,116 B2 | 2/2010 | Slaney et al. | |
| 7,720,432 B1 | 5/2010 | Colby et al. | |
| 7,765,574 B1 | 7/2010 | Maybury et al. | |
| 7,778,519 B2 | 8/2010 | Harville | |
| 7,844,985 B2 | 11/2010 | Hendricks et al. | |
| 2002/0046084 A1 | 4/2002 | Steele et al. | |
| 2002/0062481 A1 | 5/2002 | Slaney et al. | |
| 2003/0055831 A1 | 3/2003 | Ryan et al. | |
| 2003/0110499 A1 | 6/2003 | Knudson et al. | |
| 2003/0200128 A1 | 10/2003 | Doherty | |
| 2004/0194131 A1 | 9/2004 | Ellis et al. | |
| 2009/0210902 A1 | 8/2009 | Slaney et al. | |
| 2010/0242063 A1 | 9/2010 | Slaney et al. | |
| 2010/0281499 A1 | 11/2010 | Harville | |
| 2013/0014157 A1 | 1/2013 | Harville | |

FOREIGN PATENT DOCUMENTS

| | | |
|---|---|---|
| JP | 403184484 | 8/1991 |
| JP | 403229597 | 10/1991 |
| JP | 4051628 A | 2/1992 |
| JP | 05037870 A | 2/1993 |
| JP | 406303569 | 10/1994 |
| JP | 7507169 | 8/1995 |
| JP | 408235676 | 9/1996 |
| JP | 9269923 | 10/1997 |
| JP | 409284706 | 10/1997 |
| JP | 411008835 | 1/1999 |
| JP | 611261909 | 9/1999 |
| WO | WO-9319427 | 9/1993 |
| WO | WO-94/13107 | 6/1994 |
| WO | WO-94/16442 A1 | 7/1994 |
| WO | WO-95/15649 | 6/1995 |
| WO | WO 95/15658 | 6/1995 |
| WO | WO-96/24115 | 8/1996 |
| WO | WO-9630864 | 10/1996 |
| WO | WO-97/00494 | 1/1997 |
| WO | WO-97/00581 | 1/1997 |
| WO | WO-97/00582 | 1/1997 |
| WO | WO-97/41683 | 11/1997 |
| WO | WO-98/24242 | 6/1998 |
| WO | WO-98/24243 | 6/1998 |
| WO | WO-98/28906 | 7/1998 |
| WO | WO-9904561 A1 | 1/1999 |
| WO | WO-99/38320 | 7/1999 |
| WO | WO-99/45702 | 9/1999 |
| WO | WO-99/52285 | 10/1999 |
| WO | WO-99/55066 | 10/1999 |
| WO | WO-99/60789 | 11/1999 |
| WO | WO-00/22818 | 4/2000 |
| WO | WO-00/33160 | 6/2000 |
| WO | WO-00/33163 | 6/2000 |
| WO | WO-00/33228 | 6/2000 |
| WO | WO-00/33233 | 6/2000 |

OTHER PUBLICATIONS

"About GAIN Ad Vehicles," http://www.gainpublishing.com/about, pp. 1-2 [accessed Apr. 26, 2004].

"Double Click Press Kit," www.doubleclick.com, 2 pages, Feb. 22, 2000.

"GAIN—Support Center," http://www.gainpublishing.com/help/gainfaq.html, pp. 1-5 [accessed Apr. 26, 2004].

"GAIN Publishing-Software," http://www.gainpublishing.com/software, pp. 1-3 [Internet accessed Apr. 26, 2004].

(56) References Cited

OTHER PUBLICATIONS

"General Instrument & ACTV to Offer a Complete Solution for Addressable, Targeted Digital Television Advertising," ACTV and The BOX Music Network, Press Release, www.actv.com/newpage/press/actvgiad.html, Jun. 14, 1999, 3 pages.

"MIT Media Lab's Hypersoap uses hyperlinks to mix shopping, entertainment," MIT News, Nov. 9, 1998, 3 pgs. [Internet accessed on Nov. 23, 1999].

"Scientific-Atlanta's Explorer 2000 Advanced Digital Set-Top Will Support ACTV's *Inidvidualized Television*'" ACTV and Scientific-Atlanta, Press Release, www.actv.com/newpage/press/actvsatl.html, Jan. 25, 1999, 3 pages.

"What is Wink: How wink works," www.wink.com, 3 pages, Jan. 1, 2000.

Adauction.com, http://web.archive.org/web/20000302051902/http://www.adauction.com, pp. 1-2, internet archive date of Mar. 2, 2000 [accessed Apr. 6, 2007].

AsSeenIn.com, http://www.asseenin.com/asseenin/infor, 3 pgs. [Internet accessed on Jan. 12, 2000].

Bove, M., et al., "Adding Hyperlinks to Digital Television," MIT Media Laboratory, Proc. 140th SMPTE Technical Conference, 1998, 11 pages.

Bregler et al., "Video Rewrite: Driving Visual Speech with Audio, Interval Research Corporation," Abstract and ACM SIGGRAPH 97 Paper, 10 pages.

CLARIA, Products and Services Overview, http://www.clairia.com/products/index.html, pp. 1-3 [Internet accessed Apr. 26, 2004].

Darrell et al., "A Virtual Mirror Interface using Real-time Robust Face Tracking," Proceedings of the Third International Conference on Face and Gesture Recognition, Apr. 1998, IEEE Computer Society Press, Nara, Japan, 20 pages.

Delio, M., "TV Commercials Get Personal," Wired News, Sep. 20, 2000, www.wired.com/news/print/0.1294.38754.00.html, 3 pages.

Ebert, R., "The Incredible Shrinking Media Lab," Y-Life: Roger Ebert-Critical Eye, Mar. 1999, http://www.zdnet.com, 3 pgs. [Internet accessed on Nov. 23, 1999].

Fujikawa, "Subrogation of User Account by Advertisement", Nikkei Communications, Nikkei BP Company, Mar. 4, 1996, Japan, No. 217, p. 54.

Gomes, "Upstart's Internet 'TV' Has Microsoft Tuned in," Wall Street Journal, Aug. 1996, 1 page.

Koenen, R., "Overview of the MPEG-4 Standard," International Organisation for Standardisation Organisation Internatioanale De Normalisation ISO/IEC JTC1/SC29/WG11 Coding of Moving Pictures and Audio, ISO/IEC JTC1/SC29/WG11 N4030, Mar. 2001, http://www.cselt.it/mpeg/standars/mpeg-4/mpeg-4.htm, pp. 1-78.

Letter of Interrogation for Japanese Application No. 1997-533741, Mail Date Jun. 16, 2009, 7 pages.

Lyon, R.F., "The Optical Mouse, and an Architectural Methodology for Smart Digital Sensors," Xerox PARC, VLSI-81-1, Aug. 1981, 38 pages.

Moghaddam et al., "Research Index: Probabilistic Visual learning for Object Detection," http://citeseer.nj.nec.com/moghaddam95probabilistic.html, 1995, 3 pages.

Moghaddam, B. et al., "Abstract: Probabilistic Visual learning for Object Detection," IEEE Transactions on Pattern Analysis and Machine Intelligence, vol. 19, No. 7, Jul. 1997, www.computer.org/tpami/tp1997/i0696abs.htm, 1 page.

Rigdon, "Screen Savers Go Beyond Fish, Flying Toasters," Wall Street Journal, Feb. 13, 1996, 1 page.

Staff Reporter, "PointCast Inc. is Testing New Screen-Saver Product," Wall Street Journal, May 1996, 1 page.

Sutton et al., "Reinforcement Learning: An Introduction," http://www-anw.cs.umass.edu/~rich/book/the-book.html, MIT Press, Cambridge, MA, 1998, 4 pages.

Tokuda, "To Make the Internet Free—Mr. Y. Itakura (president of Hyper-net company)", Nikkei Business Publications, Inc., Mar. 11, 1996, Japan, No. 831, p. 136-140.

\* cited by examiner

| INFORMATION | DEVICE USED TO OBTAIN INFORMATION |
|---|---|
| Viewer | Camera, Manual Input, Speech Recognition |
| Shows Watched | Recorded in Set Top Box |
| Viewing Times | Recorded in Set Top Box |
| Household Demographics | Manual Input |
| Light of Viewing Room | Camera or Light Sensor |
| Temperature of Viewing Room | Thermometer |
| Motion Activity of Viewer | Camera |
| Channel Change Activity | Recorded in Set Top Box |
| Viewer Using Remote Control | Different Remote Control for Each Viewer |
| Audio Detection | Microphone |
| Facial Expressions | Camera |
| Body Size, Shape, and Movement | Camera |
| Number of Viewers | Microphone |

*FIG. 5*

SYSTEM AND METHOD FOR SELECTING ADVERTISEMENTS

CROSS-REFERENCE TO RELATED APPLICATION(S)

The present application is a continuation of U.S. patent application Ser. No. 13/475,822 filed May 18, 2012 which is a continuation of U.S. patent application Ser. No. 12/793,540 filed Jun. 3, 2010 (now U.S. Pat. No. 8,185,923), which is a continuation of U.S. patent application Ser. No. 09/789,926 filed Feb. 20, 2001, which claims the benefit of U.S. Provisional Patent Application No. 60/185,182, filed Feb. 25, 2000, each of which is incorporated by reference herein in its entirety.

BACKGROUND

The present invention relates generally to interactive television, and more particularly, to a system and method for selecting or modifying advertisements to display to a viewer.

The distribution of advertisement via television is well established. Advertisers typically purchase advertisement time on a specific channel and time period with the rate being set by the popularity of programs airing within the time period. The more popular the underlying program or time slot, the more expensive the advertising rate. With the increase in the number of network stations, advertisers are confronted with the task of determining which stations are appropriate for their products or services. It is also difficult for advertisers to select a type of advertisement that will appeal to a broad cross section of the population (e.g., males, females, young and old).

Commercials are often targeted based on the type of television shows a viewer watches. For example, an advertisement for tulips is preferably displayed to a viewer who watches gardening programs. Similarly, an advertiser on the Internet may track the web sites that a user visits and use this information to determine that the user is interested in gardening. A banner ad for tulips may then be displayed to the user. Internet advertisement companies often use a targeting technology that allows advertisers to target consumers through the use of profiling criteria developed based on users activity on the Internet. The decision as to which advertisement to display is made remotely (e.g., cable headend system or server). This requires that information about a user be transferred to a remote collection area, which can create privacy problems. A user may not want personal information collected on his television viewing or "surfing" habits and provided to advertisers or other service providers.

Furthermore, from a consumer's perspective, one of the most irritating aspects relating to advertising is the inability of the consumer to provide any control over the content of the advertisement information. The viewer can only watch what is presented and cannot switch between different advertisements as he can with programs or interact with the advertisement.

New technology makes skipping commercials even easier. Consumers today often skip commercials that they do not want to see. However, commercials pay for almost everything on commercial television. High-priced shows are paid for by the value that advertisers perceive in displaying their ads during the show. As commercials become less effective, more ad dollars are being devoted to product placement within the television shows. For example, advertisers pay high prices for an actor to use their product in a show. Ideally, advertisers want to deliver a message appropriate for each viewer. Advertisers are willing to pay higher costs for even better viewer focus than merely a group of people watching a specific show.

There is, therefore, a need for a method and system that can be used to target advertisements to specific viewers or create interest in the advertisement by allowing viewers to interact with the advertisement.

SUMMARY

A method for displaying interactive advertisements on a television having a controller connected thereto and configured for receiving input from a viewer of the television is disclosed. The controller has a receiver operable to receive advertisements and a processor operable to modify the advertisements. The method generally comprises requesting action by the viewer of the television, modifying an advertisement based on the action of the viewer, and displaying the modified advertisement on the television.

The action requested by the viewer may include requesting an answer to a question displayed on the television, having a camera take a picture of a person in the room, requesting the viewer to input a name into the controller, interaction with a game displayed on the television, requesting the viewer to input a personal profile into the controller, or rotating a product displayed by a video catalog, for example. The controller may further include a camera, microphone, light sensor, temperature sensor, or a motion sensor for collecting information about the viewer or viewing environment.

A system of the present invention generally comprises a controller configured for connection to the television and operable to receive input from a viewer of the television. The controller has a receiver operable to receive advertisements and a processor operable to request action by the viewer of the television, modify the advertisement based on the action of the viewer, and display the modified advertisement on the television.

In another aspect of the invention a system for displaying advertisements on a television comprising a controller coupled to the television generally comprises a memory device operable to store information about at least one viewer of the television and a receiver configured for receiving an advertisement scheduled for display on the television at a specified time. The system further includes a processor operable to modify the received advertisement based on action by the viewer.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 5 is a list of information which may be collected about a viewer and devices that may be used to collect the information.

Corresponding reference characters indicate corresponding parts throughout the several views of the drawings.

DETAILED DESCRIPTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

As previously discussed, it is important to target advertisements to specific viewers to make advertisements more effective. The present invention provides a method and system for displaying advertisements to consumers that are interested in the message content of the advertisements or making advertisements interactive so that consumers have more control over what type of advertisement they view and the advertisement appears more interesting to the consumer.

In one embodiment, the method utilizes targeting of advertisements based on passive techniques to convey a message to the viewer without requiring active participation by the viewer. In another embodiment, the speed of communication networks, such as the Internet or digital cable or satellite systems, are used to provide an interactive advertisement. Encouraging a viewer to interact with a commercial message is one way to get their attention. The viewer's response also shows that the viewer is paying attention to the advertiser's message. As described below, a fast video line and an intelligent box in the viewers home allow the viewer to interact with the advertisement and give the viewer a reason to pay attention to the advertiser's message. The following describes both passive (targeting) and active (interactive) techniques of the present invention.

Figure 1:
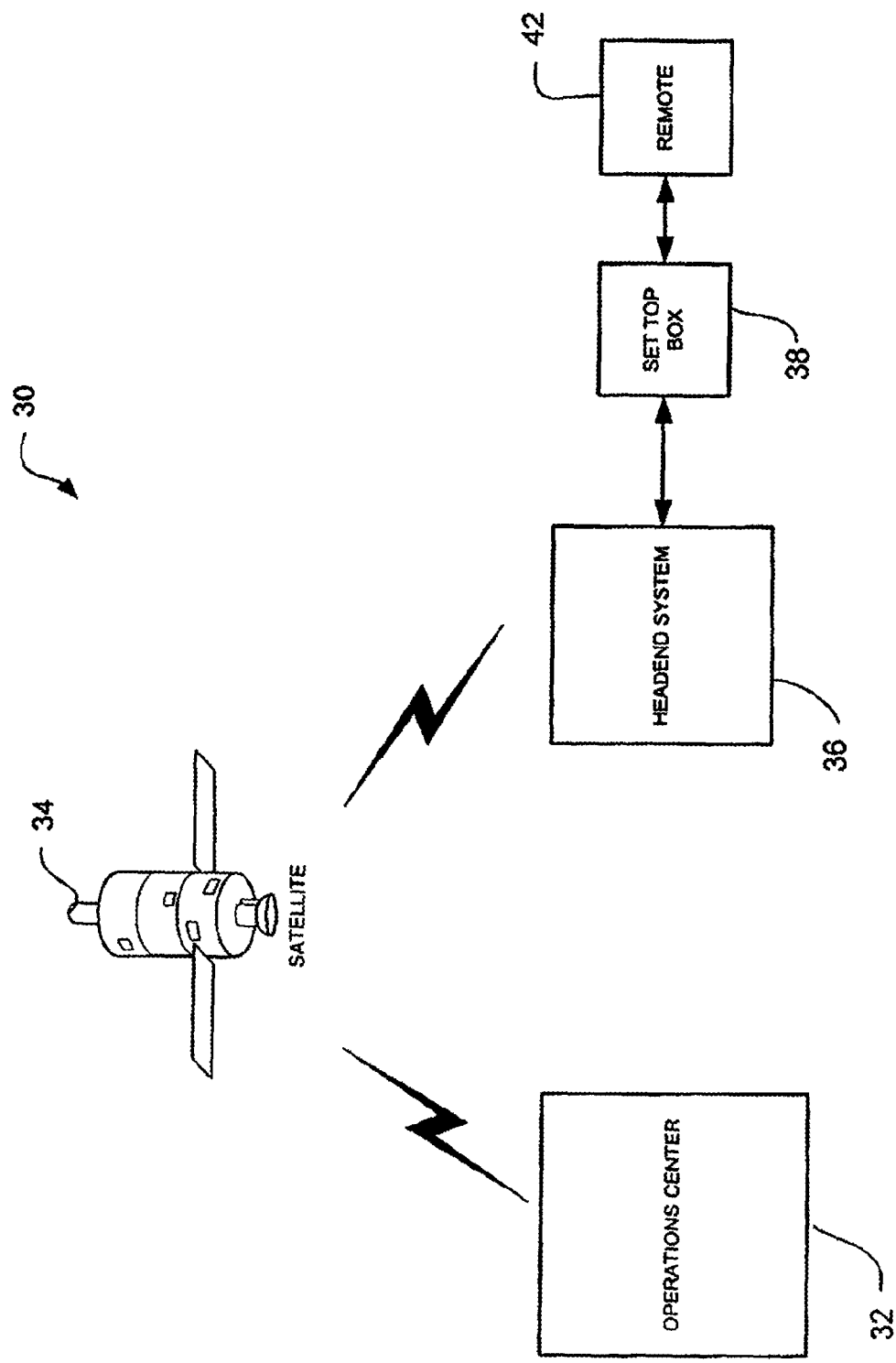
FIG. 1 is a diagram of a television delivery system that may be used to delivery advertisements.

The advertisements are preferably displayed on a television connected to a network system such as cable network system 30 shown in FIG. 1. In one embodiment, the system 30 includes an operations center 32 where control information is assembled in the form of digital data, a digital compression system where the digital data is compressed, combined, multiplexed, encoded, and mapped into digital signals for satellite 34 transmission to a headend system 36 and a plurality of in home set top boxes 38, or other suitable receivers, operable to decompress the digital data and display the advertisement for a viewer. The decompressed communication signals may be converted into analog signals such as NTSC (National Television Standards Committee) format signals for television display. The signal is typically compressed prior to transmission and may be transmitted through broadcast channels such as cable television lines or direct satellite transmission systems. Telephone lines, cellular networks, fiber optics or any other suitable transmission means may be used in place of the cable system. Control signals sent to the set top box 38 are also decompressed and either executed immediately or placed in local storage such as RAM. The set top box 38 may then be used to overlay or combine different signals to form the desired display on the viewer's television.

It is to be understood that the system 30 described above and shown herein is only one example of a system used to convey signals to the television 45. The television network system may be different than described herein without departing from the scope of the invention.

Figure 2:
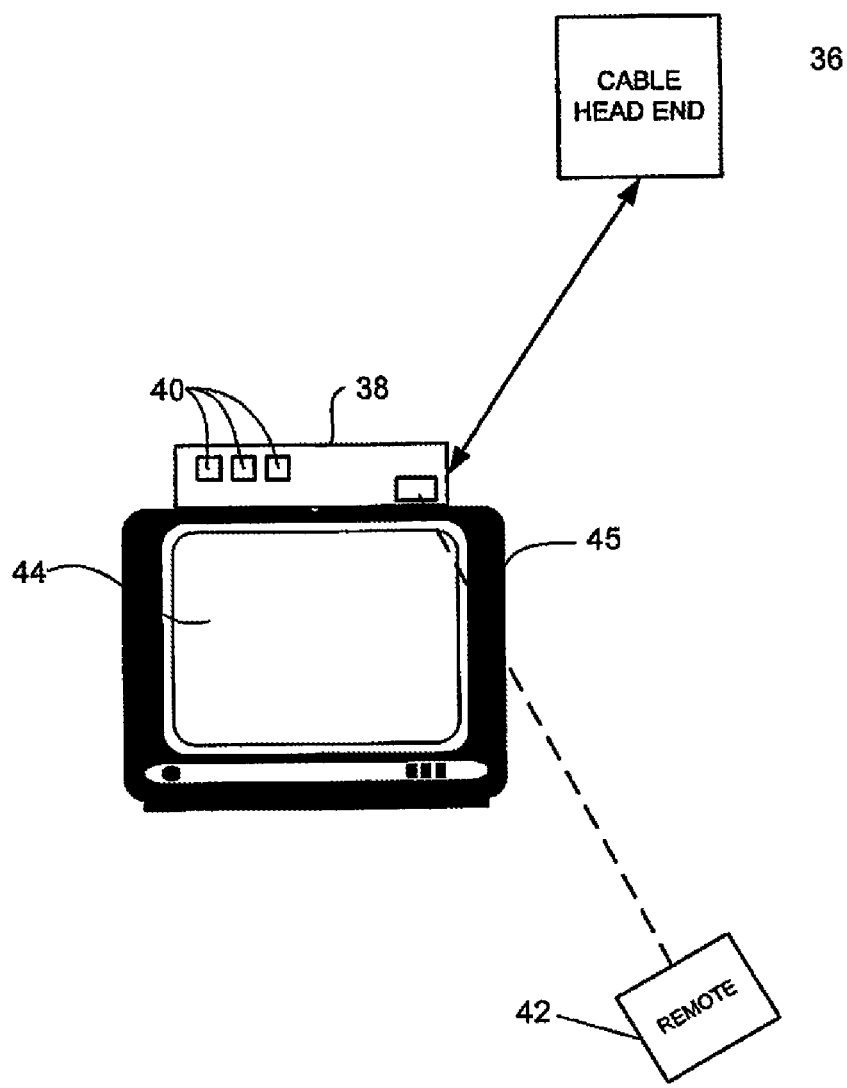
FIG. 2 is a schematic illustrating a set top box connected to a television and in communication with a headend system, and a remote operable to control the set top box.

The video signals and program control signals received by the set top box 38 correspond to television programs, advertisements, and menu selections that the viewer may access through a viewer interface (FIG. 2). The viewer interface may be buttons 40 located on the set top box 38 or a portable remote control 42 which operates the set top box or interfaces with control objects displayed on the television screen 44. The remote control 42 may include joystick type controls operable to move a cursor on the television screen 44 as well as up/down and numeric control buttons. The control objects displayed on the screen may be up/down control icons or a menu containing a list of options. For example, interactive graphics may be displayed as an overlay to an advertisement in a corner of the television screen 44. The viewer may move a pointer over an up icon on screen 44 to go to the next advertisement or a down icon to go to the previous advertisement. The graphics may also allow a viewer to point to an object and interact with it (e.g., move it to a different location on the screen). The control objects are preferably generated by the set top box 38 which uses interactive information to execute an application while audio and video information is transmitted to the television 45. The set top box 38 may combine audio and video information with interactive graphics prior to transmitting the information to the television 45.

The set top box 38 may be configured for receiving analog signals, digital signals, or both analog and digital signals. If digital signals are received by the set top box 38, the advertisements may be variants of one another (e.g., same video stream with different graphic overlays), as further described below. The set top box 38 may be configured for use with an interactive digital system which provides a forward path to the user and a return path to the local network gateway. The return path provides a two-way data stream to enable interactivity.

The set top box 38 may be configured, for example, to receive the following input: analog video channels; digital video channels which support broadband communications using Quadrature Amplitude Modulation (QAM); and control channels for two-way signaling and messaging. The digital QAM channels carry compressed and encoded multiprogram MPEG (Motion Picture Experts Group) transport streams. A transport system extracts the desired program or advertisement from the transport stream and separates the audio, video, and data components, which are routed to an audio decoder, video decoder, and RAM, respectively. The set top box 39 may further include a compositor which combines graphics and text with MPEG or analog video.

Figure 3:
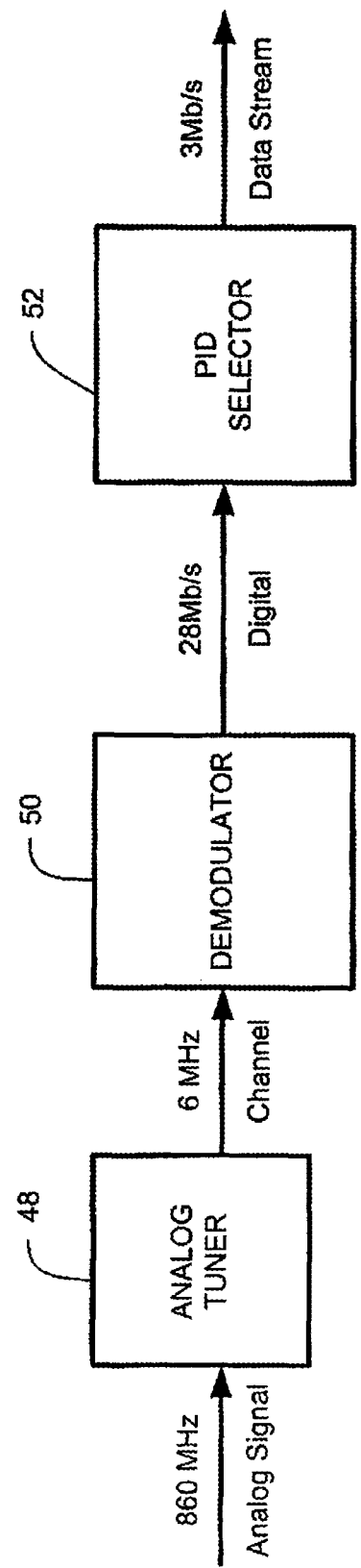
FIG. 3 is a block diagram of a tuner used to select a channel, a demodulator operable to convert the signal into a digital format, and a program ID selector used to select a data stream containing one or more advertisements.

A broadband analog signal (e.g., 680, 750, 860 MHz) received by the set top box 38 carries multiple channels and is conveyed to a tuner 48 which selects one frequency band out of the available spectrum (FIG. 3). In typical cable systems, a 6 MHz piece of spectrum (i.e., channel) is selected out of a range of 50 MHz to possibly 1,000 MHz. The 6 MHz bandwidth may include a program and a number of data streams carrying different advertisements. A demodulator 50 converts the analog signal to a digital signal (e.g., 28 Mb/s) containing a plurality of data streams (e.g., 3 Mb/s data stream). A program ID (PID) selector 52 may be used to select one 3 Mb/s data stream. In order to reduce the 28 Mb/s data stream to a 3 Mb/s data stream, the PID selector 52 looks for packets having a requested program ID, and throws out the rest of the packets. This allows a viewer to switch between different data streams within the 6 MHz bandwidth and display various advertisements for viewing. Thus, viewers watching different television sets may view different advertisements even though the viewers are tuned to the same channel.

It is to be understood that the system used to select a channel and convert the analog signal to digital may be different than shown in FIG. 3 and that the sample data streams and channel bandwidths may be different than described herein without departing from the scope of the invention.

In a first embodiment of the present invention, passive technologies are used to improve an advertiser's ability to convey a message to a viewer. As described below, these technologies include identifying the viewer, the viewer's preferences, or the viewing environment.

Figure 4:
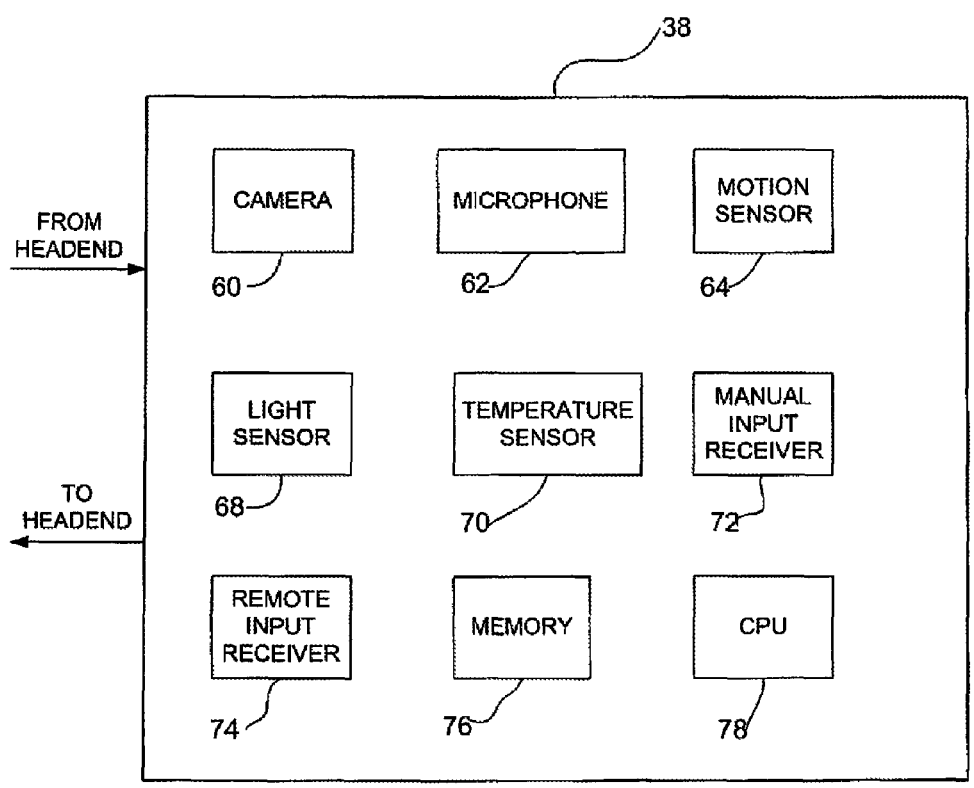
FIG. 4 is a block diagram of the set top box of FIG. 2.

Preferably, the system does not transmit or publish any personal information about the user. In one aspect of the invention, several forms of rich-media advertising are delivered to the user's home and the set top box decides which content to deliver to the viewer. The system may report back to a home system which commercials are viewed, without identifying or personal information about the viewer. FIG. 4 illustrates an example of a set top box that may be used to receive information from the headend cable system 36, collect information about the viewer or viewing environment, and send information back to a central office which collects data. The set top box 38 may include, for example, a camera 60 which collects information about specific viewers in the room and may be used to collect images of specific viewers for placement in advertisements, as described below. A microphone 62 may also be used to identify viewers in the room with the use of speech recognition software. The set top box 38 may further include sensors such as a motion sensor 64 used to detect viewer activity in the viewing room, a light sensor 68 operable to detect the lighting in the room, and a temperature sensor 70 operable to sense the temperature in the room. A viewer may also manually input data into a manual input receiver 72. A remote input receiver 74 is provided to interface with the remote control 42. The set top box 38 further includes memory 76 which is used to at least temporarily store data about a viewer and may also be used to temporarily store advertisements sent from the headend system 36 to the set top box 38 for display to a viewer. A central processing unit (CPU) 78 is provided to process information collected about a viewer and modify an advertisement accordingly. For example, an advertiser may send a single advertisement to the set top box along with instructions on how to modify the advertisement based on viewer information stored in memory 76 of the set top box 38. The processor 78 uses this information to modify the advertisement before displaying it to the viewer.

FIG. 5 shows a list of exemplary information that can be obtained and stored in set top box 38 to provide information about a viewer and their environment. For example, camera 60 may be used to recognize a specific viewer in the room. Once the set top box 38 recognizes a viewer, a symbol may be displayed on the set top box identifying who is in the room. Thus, a person can be identified with a symbol rather than a name. The viewer may also be identified by speech recognition software using microphone 62, by the viewer entering a code into the set top box 38, or by the viewer using a specific remote control 42 identified for use by the viewer. The set top box 38 may also record shows watched, viewing times, and channel change (surfing) activity.

A viewer may also create a personal profile by entering demographics and related information into the set top box 38 (e.g., by querying the viewer on his birthplace, education level, type of employment, age, sex, and the like). The personal profile may also be created based on viewing history of the user through an information gathering process. The personal profile may be set up during initialization of the set top box 38 the first time the viewer uses the box, for example. Once the information is entered, it will be stored in the set top box memory 76 and may later be modified by the viewer, or additional profiles may be added for new viewers. Since this information is stored on the viewer's set top box 38 and not transferred to a remote data collection site, the viewer does not need to be concerned about privacy issues.

Various equipment may also be used to detect the environment of the room (e.g., temperature, light, motion of viewers, noise, number of viewers). This information may be used to determine the mood of the viewer and select an advertisement that is appropriate. For example, if the room is dark and the volume is low, the viewer is most likely not interested in seeing a loud bright commercial full of people and activity.

There are many sources of information about the viewer's interests. Each time the viewer clicks the remote control 42 there is a bit more information about what they like to view. The camera 60 and microphone 62 in the set top box 38 may be used to provide information on who is in the room and how active they are. Even knowing that the room is dark and the volume on the TV set is low provides information about the mood and what messages the viewer will most likely be interested in. It is difficult to absolutely recognize faces without help from the users (if only to provide a name to go with the face.) But it is easy to note that one face is always in the room when watching Oprah and another face watches Monday Night Football and from that correspondence tell who is watching the national news. The most appropriate commercial is then chosen based on who is in the room.

An especially valuable bit of information is knowing which content keeps the viewer's attention. Actively pressing a button to switch channels provides input that the viewer was not interested in that particular commercial. Playing the same commercial again will probably not fare any better. On the other hand, if the viewer stops changing channels after landing on a specific ad, then it should probably be played again. This is a simple example of reinforcement learning. The memory device 76 and CPU 78 may be used for reinforcement learning and video based tracking.

Reinforcement learning may be used as follows. Each commercial may contain one or more keywords indicating the content of the commercial. The keywords are used to determine which advertisements a consumer is most likely to watch. The keywords preferably include a product name, product category, and a bit about the style of the advertisement. Each time a commercial is played, the viewer's behavior is captured and used to modify the weight attached to each keyword. Thus, a commercial might be labeled "Doritos, snack food, sexy female." Each time a viewer watches the entire commercial then the values for those three keywords are increased. Likewise, if the viewer quickly changes channels away from that particular commercial the value of those keywords are decreased. When an advertisement is ready to be displayed information stored in the set top box is used to select the commercial whose keywords have the highest value.

Figure 6:
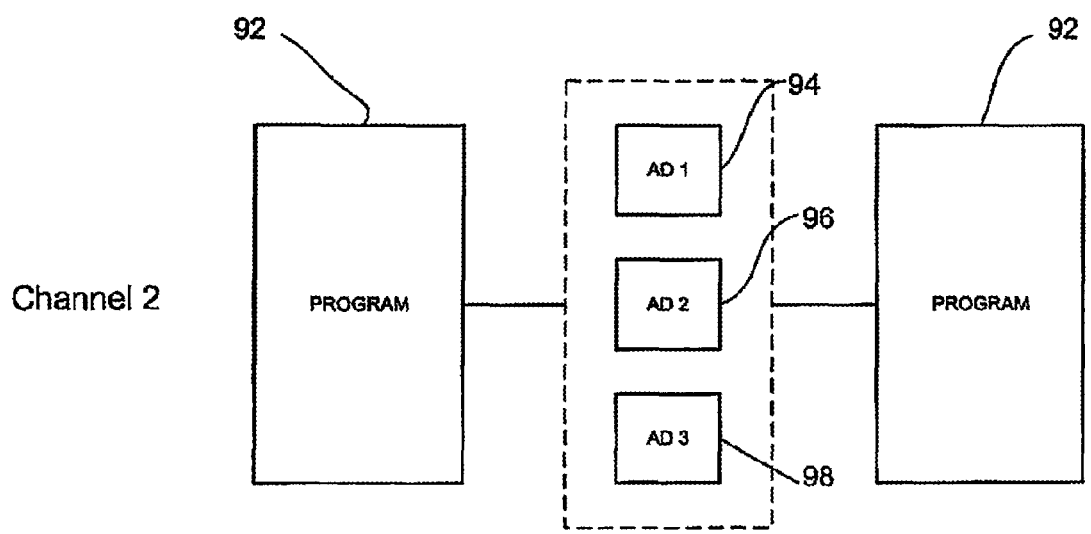
FIG. 6 is a block diagram illustrating multiple advertisements inserted between program material.

As previously described, information about the viewer or environment may be used to select one advertisement from a plurality of advertisements delivered to the set top box 38. The system shown in FIG. 6 provides three advertisements for selection for display on a television during a break in television programming 92. Instead of providing a single advertisement which may or may not be of interest to the viewer, the system shown in FIG. 6 provides three different advertisements (or three variants of one advertisement) 94, 96, 98. For example, the first advertisement 94 may be for a food product directed to young males, the second advertisement 96 may be for the same food product but directed to young females, and the third advertisement 98 may also be for the same food product but directed to parents. In another example, the variants may be different colors or types of cars. Variations in the advertisements may be provided by a number of different animation techniques including sprites, morphing, or embedded constraints graphics, as described in U.S. patent application Ser. No. 09/514,056, filed Feb. 25, 2000, Ngo et al., entitled "System and Method for Displaying Advertisements" which is incorporated by reference herein. Each advertisement may include images, audio data, and informational references. The images may be advertisements for products or services and may include still pictures or video images, for example. Audio data may include voice, music, or other audio signals for playback in coordination with the images. The images may also be informational images unrelated to advertising. For example, information services including weather information, stock market services, news services or the like may provide the informational images and audio data.

The advertisements may also include links to other information such as detailed information about the advertised product, purchasing information and the like. For example, if after viewing an advertisement, the viewer wants to obtain additional information about an advertised product, the viewer may select an option listed in a menu which immediately directs the viewer to a new commercial or information piece providing additional information on the product.

After the advertisement is displayed, aggregate viewing feedback may be used to report back who actually viewed the commercial and a bit of information about how it was received by the viewer. As previously described, the system includes two-way channels so that information can be sent back to the headend 36 and advertiser. The set top box 38 may be used, for example, to gather information about the viewing habits of the household. The set top box 38 may report back that a household watched a particular commercial. More detailed information can be collected by noting correspondences between which shows are watched and which commercials are seen. Using this tracking technology, detailed information about who is actually in the room during the displaying of an advertisement can be collected. The following is an example of the type of data that may be collected and provided to an advertiser regarding the success of their advertisements:

Viewer Statistics:
12 million married women between the ages of 40 and 50 viewed the commercial;
1 million turned the commercial off during the duration; those who turned it off:
are three times more likely to watch thrillers than those who did not turn it off; and
are two times less likely to watch soap operas.
6 million teen girls viewed the commercial;
1 million teen boys viewed the commercial; and
1 million girls between the age of 6 and 12 viewed the commercial.

In addition to sending separate advertisements as shown in FIG. 6, advertisers may send layered commercials, where each layer corresponds to a different product or feature. The video signal seen by the viewer is created by overlaying the appropriate layers. The result is that one viewer might see a bright red car while another more sedentary viewer sees a blue car. (See, for example, U.S. patent application Ser. No. 09/514,056, referenced above.) The set top box 38 is preferably operable to receive MPEG streams with layer codes and MPEG stream modifications that describe product position and produce real-time video processing to substitute new product video. MPEG-4, for example, allows the video to be described in terms of a number of layers. To produce the video that is seen by the user, the set top box decompresses each layer and then adds the appropriate layers together before sending the pixels to the screen. Layers are used by the system to represent different products. Using the tracking technology described above, the most appropriate product is selected and the correct video layer displayed to the user. Other modifications may be made to the advertisement. For example, based on the viewer's home address, the address of the closest store can be displayed, and even directions. Different features may be emphasized to those people who watch game shows versus those that watch comedies. For example, advertisers may want to change the product characteristics for different viewers, list different advantages or change the color of products. A generic product can be replaced with a specific, custom product for each viewer. This placement could be done up to the last minute, with each type of viewer going to the highest bidder.

Alternatively, an advertisement modification may be sent down to the viewer's set top box 38 ahead of time and stored in memory 76. Then using data portions of the MPEG video stream areas of the video which should be modified are identified. The set top box 38 can then use the viewer profile or other information to find the right pixels to modify and perform the image processing operations.

The information collected about viewers may be used to let advertisers bid for different viewers. For example, one advertiser may be willing to pay 5 cents for any female between the ages of 20 and 40, while another advertiser may pay 10 cents for twenty-five year-old females. This allows the advertisement to be selected based on the highest bidder. Orders may be collected from advertisers and the commercial selected based on the highest bidder for that specific viewer.

The techniques described above cater to the passive nature of most television viewing. However, people often like to be in control of what they view. For example, people spend time at Amazon's web site because they like the content and the feel of the electronic store. Interaction between an advertiser and a consumer can help to make a sale. The following describes a number of different techniques that allow consumers to interact with advertisements and thus improve the value to advertisers.

Local intelligence in the set top box 38 allows for many different types of viewer interaction. In one embodiment, the advertiser presents the viewer with a question and the viewer selects an answer with the remote control 42. The advertisement may solicit an answer to a question to keep the viewer engaged (e.g., have you tried the Pepsi challenge yet?). The set top box 38 is used to report back the answer, along with viewing statistics using a set top box modem or other connection. The advertiser can then use this information to issue coupons to the appropriate viewers.

Presenting an advertisement in the form of a game is another method that may be used to capture a viewer's attention. For example, a beer advertiser may let viewers shoot at frogs or lizards on the screen. Another example is to put a viewer in a James Bond road race game with a BMW Z3 so that viewers can see if they like the experience. The game may be downloaded through a digital connection into the set top box 38, for example. A pointing device which interacts with the television 45 and set top box 38 is preferably included in the system. The advertiser may also send a coupon (electronic or paper) to viewers that score high in a simple 30-second game. Viewers may also choose their ending to an advertisement. Multiple versions of the ad may be sent to the set top box 38, as previously described. The set top box 38 then plays the appropriate ending, based on the user's interactions.

Another method for capturing the viewer's attention is to personalize an advertisement. For example, camera 60 installed on the set top box 38 can be used to take a picture of a viewer's baby. A furniture commercial is then displayed with the baby playing on the floor surrounded by furniture in the advertisement. Similarly, a family dog can be displayed in a dog food commercial or a face from the family can be looking out of a hotel window. The advertisement may also contain the viewer along with their favorite movie star.

The set top box 38 is preferably configured to process real-time video. Video Rewrite technology may be used to build models of a human face. (See, for example, "Video Rewrite: Driving Visual Speech with Audio", Bregler et al. ACM SIGGRAPH 97.) This technology may be used interactively by requesting the viewer to stand in front of the camera or via passive viewing of the audience using the set top box 38. A dialog box that requests one of the children to stand in front of the camera may be presented to the viewer. Face-id software may be used to identify faces in the room and then extract the faces for later use. (See, for example, "Probalistic Visual Learning for Object Representation", B. Moghaddam et al., IEEE Transactions on Pattern Analysis and Machine Intelligence, Vol. 19, No. 7, July 1997.)

Computer vision may also be used to track what the viewer is doing and tailor the commercial to fit the viewer's activities. This may be as subtle as allowing a spokesperson's eyes to follow the viewer around the room as he goes about his activities. It may also be more direct by inserting the viewer's name or other personalized information into the pitch. In another example, a dog in the advertisement may do something appropriate to get the attention of viewers in the room. The video may be modified so that a spokesperson speaks a viewer's name.

Computer vision technology may also be used to sense where the user is. (See, for example, "A Virtual Mirror Interface Using Real-time Robust Face Tracking", Darrell et al., Proceedings of the Third International Conference on Face and Gesture Recognition, IEEE Computer Society Press, April 1998, Nara, Japan.) Using technology such as Video Rewrite (or generic computer graphics) images that follow the user around the room can be generated. Facial identification may be used to determine who is in the room and a character in the advertisement may use the viewer's name.

Custom video catalogs may also be used to attract a viewer's attention. The catalogs may be used to get more information about a product so that the consumer can make an informed buying decision. Many advertisers do this today by providing a web address. But interactive television can do much more by giving viewers a chance to spend more time with the product. The advertisements may contain three-dimensional video models of the product which can be turned and stopped by the viewer to see how the product looks from different angles. Technology such as fly-around video may be used, for example. Fly-around video allows a viewer to see a product from all angles. The set top box 38 preferably includes a system such as Apple's Quick Time VR Authoring (QTVR) or similar technology to store video and allow real-time video processing to synthesize product views. A graphical user-interface provides a user with control of angles. Apple's QTVR technology, or Fly-Around Video (see e.g., U.S. patent application Ser. No. 60/152,352, "Head-Tracked Light Field Movies: A New Multimedia Data Type" by G.

Miller et al. filed Sep. 7, 1999) allows a user to view an object from many different directions. When a user is browsing through the video catalog all objects are preferably three-dimensional so that the user can navigate around the object using the remote control or other user interface techniques.

The system may also be used to put a viewer into a virtual environment. This includes putting an image of the viewer on the couch of a furniture display or draping clothes over the image. The viewer's body size can be captured electronically, subtlety slimmed down, and then draped with the advertiser's product. Electric Planet articulated pose estimation technology may be used to see how the person is moving and to move the corresponding video model in real time. (See, for example, U.S. Pat. No. 6,141,463 issued Oct. 31, 2000, by M. Covell et al., "Method and System for Estimating Jointed-Figure Configurations.")

All references cited above are incorporated herein by reference.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

We claim:

1. A method for displaying interactive advertisements on a television having a controller connected thereto and configured for receiving input from a viewer of the television, the controller having a receiver operable to receive advertisements and a processor operable to modify the advertisements, the method comprising:
   requesting action by the viewer of the television;
   receiving the requested action from the viewer;
   receiving personal information or preferences associated with the viewer,
      wherein at least a portion of the personal information or preferences is input by the viewer via a user input device, and
      wherein the personal information includes an image of the viewer;
   receiving at the receiver at least one television advertisement,
      wherein the received television advertisement relates to at least one product offered by a particular advertiser,
   modifying the advertisement based on the action of the viewer,
      wherein at least one action is received from the viewer during display of the advertisement, and
      wherein modifying an advertisement includes inserting the image of the viewer into the advertisement;
   displaying the modified advertisement on the television; and
   transmitting to a remote data collection site an indication of the displayed advertisement,
      wherein the transmission does not include any personally identifiable information associated with the viewer.

2. The method of claim 1 wherein requesting action comprises displaying a question on the television and requesting an answer from the viewer.

3. The method of claim 1 wherein the controller further includes a camera and requesting action comprises having the camera take a picture of a person in a room containing the television.

4. The method of claim 3 further comprising inserting an image received by the camera into the advertisement.

5. The method of claim 1 wherein requesting action comprises requesting the viewer to input a name into the controller.

6. The method of claim 1 wherein modifying an advertisement comprises inserting the name into the advertisement.

7. The method of claim 1 wherein displaying the advertisement comprises displaying an interactive game, and wherein requesting action comprises requesting interaction with the game.

8. The method of claim 1 wherein requesting action comprises requesting the viewer to input a personal profile into the controller.

9. The method of claim 8 wherein modifying an advertisement comprises modifying the advertisement based on the personal profile.

10. The method of claim 1 wherein the advertisement is a video catalog and wherein the action of the viewer comprises rotating a product displayed in the video catalog.

11. The method of claim 1 wherein the controller comprises a light sensor, and wherein the method further comprises sensing the light intensity in a room containing the television.

12. The method of claim 1 wherein the controller comprises a temperature sensor, and wherein the method further comprises sensing the temperature in a room containing the television.

13. The method of claim 1 wherein the controller comprises a motion sensor, and wherein the method further comprises sensing activity of the viewer.

14. The method of claim 1 wherein modifying the advertisement comprises selecting an advertisement based on bids submitted by advertisers.

15. A system for displaying advertisements on a television, wherein the system includes a controller operably coupled to the television, the controller comprising:
    a memory device operable to store information about at least one viewer of the television,
        wherein the information includes an image of the viewer;
    a receiver configured for receiving —
        an advertisement scheduled for display on the television at a specified time, and
        preferences associated with the viewer;
    a processor operable to modify the received advertisement based on action by the viewer, including —
        inserting the image of the viewer into the advertisement, and
        emphasizing certain features of at least one product based on the preferences associated with the viewer; and
    a transmitter operable to transmit data to a remote collection site,
        wherein the data includes an indication of the modified advertisement and does not include any personally identifiable information associated with the viewer.

16. The system of claim 14 wherein the viewer information comprises a personal profile of the viewer.

17. The system of claim 16 wherein the viewer information comprises identification of the viewer.

18. The system of claim 14 wherein the advertisement is a video catalog and action by the viewer is selecting a view of a displayed product.

19. The system of claim 14 wherein the advertisement is a game and action by the viewer is interaction with the game.

20. A computer-implemented method of displaying an interactive advertisement to a viewer via a display device, wherein the display device is connected to a media transceiver, and wherein the media transceiver is configured to receive input from the viewer via a user input device, the method comprising:
    receiving at the media transceiver at least one advertisement;
    receiving at the media transceiver a bid for the viewer from each of multiple advertisers, wherein the bid is based on at least one or more demographic statistics associated with the viewer;
    selecting at the media transceiver the received advertisement for display based on a highest bid offered for the viewer;
    requesting by the media transceiver an action from the viewer during display of the advertisement;
    receiving at the media transceiver the requested action from the viewer during display of the advertisement,
        wherein the received action includes personal information or preferences associated with the viewer, and
        wherein at least a portion of the personal information or preferences is input by the viewer to the media transceiver via the user input device;
    creating at the media transceiver an interactive advertisement,
        wherein the interactive advertisement is created by —
            modifying the received advertisement based on the received action, and
            emphasizing certain features of at least one product based on the personal information or preferences associated with the viewer; and
    displaying the interactive advertisement to the viewer via the display device.

21. The method of claim 20 wherein requesting the action from the viewer comprises at least one of:
    displaying a question on the display device, wherein the received action includes an answer to the question, and wherein the answer to the question is input by the viewer to the media transceiver via the user input device;
    displaying an interactive game to the viewer, wherein the received action includes interaction by the viewer with the interactive game, and wherein the interaction by the viewer is performed via the user input device;
    requesting the viewer to input a personal profile via the user input device, wherein the received action comprises the requested personal profile, and wherein the requested personal profile is input by the viewer to the media transceiver via the user input device; and
    displaying an interactive video catalog to the viewer, wherein the received action comprises interaction by the viewer with a product displayed in the interactive video catalog, and wherein the interaction by the viewer is performed via the user input device.

22. The method of claim 20 wherein the personal information associated with the viewer comprises a name of the viewer.

23. A system for displaying an interactive advertisement to a viewer via a display device, the display device connected to a media transceiver, and the media transceiver configured to receive input from the viewer through a user input device, the system comprising:
    means for receiving at least one advertisement at the media transceiver,
        wherein the received television advertisement relates to at least one product offered by a particular advertiser;

means for receiving at the media transceiver a bid for the viewer from each of multiple advertisers,
   wherein the bid is based on at least one or more demographic statistics associated with the viewer;
means for selecting at the media transceiver the received advertisement for display based on a highest bid offered for the viewer;
means for requesting interaction at the media transceiver from the viewer during display of the advertisement;
means for receiving the requested interaction at the media transceiver from the viewer during display of the advertisement,
   wherein the received interaction includes personal information or preferences associated with the viewer, and
   wherein at least a portion of the personal information or preferences is input by the viewer to the media transceiver via the user input device; and
means for displaying the interactive advertisement to the viewer via the display device.

24. The system of claim 23 wherein the media transceiver includes a camera, and wherein the system further comprises:
means for capturing by the media transceiver an image of the viewer; and
means for inserting the image into the interactive advertisement.

25. The system of claim 23 wherein the media transceiver includes at least one of a light sensor, a temperature sensor, a motion sensor and a microphone, and wherein the received advertisement is selected based on at least one of a sensed light intensity, a sensed temperature, a sensed level of activity and a sensed level of noise.

* * * * *